United States Patent
Senra et al.

(10) Patent No.: US 10,467,193 B1
(45) Date of Patent: Nov. 5, 2019

(54) REAL-TIME AD HOC QUERYING OF DATA RECORDS

(71) Applicant: EMC IP Holding Company LLC, Hopkinton, MA (US)

(72) Inventors: Rodrigo Dias Arruda Senra, Rio de Janeiro (BR); Percy E. Rivera Salas, Rio de Janeiro (BR); Diego Salomone Bruno, Niterói (BR); Rômulo Teixeira de Abreu Pinho, Niterói (BR); Caio Souza, Rio De Janeiro (BR)

(73) Assignee: EMC IP Holding Company LLP, Hopkinton, MA (US)

( * ) Notice: Subject to any disclaimer, the term of this patent is extended or adjusted under 35 U.S.C. 154(b) by 678 days.

(21) Appl. No.: 15/191,837

(22) Filed: Jun. 24, 2016

(51) Int. Cl.
| | |
|---|---|
| *G06F 16/16* | (2019.01) |
| *G06F 16/245* | (2019.01) |
| *G06F 16/22* | (2019.01) |
| *G06Q 50/26* | (2012.01) |

(52) U.S. Cl.
CPC ........ *G06F 16/162* (2019.01); *G06F 16/2228* (2019.01); *G06F 16/245* (2019.01); *G06Q 50/26* (2013.01)

(58) Field of Classification Search
CPC ................................................. G06F 16/162
See application file for complete search history.

(56) References Cited

U.S. PATENT DOCUMENTS

| | | | | |
|---|---|---|---|---|
| 2012/0030188 A1* | 2/2012 | Gutlapalli | ........... | G06F 16/2272 707/711 |
| 2014/0004892 A1* | 1/2014 | Murynets | ................ | H04W 4/14 455/466 |
| 2014/0149365 A1* | 5/2014 | Minborg | ................ | G06F 16/27 707/692 |

* cited by examiner

*Primary Examiner* — Richard L Bowen
(74) *Attorney, Agent, or Firm* — Ryan, Mason & Lewis, LLP (57) ABSTRACT

Methods and apparatus are provided for real-time ad hoc querying of data records, such as call detail records. An exemplary method comprises obtaining data records, wherein each data records comprises a plurality of fields and wherein one or more fields are used to aggregate a history of the data records; storing the data records in a consolidation queue (and optionally, a waiting queue), based on predefined indexing criteria; storing the data records from the consolidation queues in a historical database based on one or more predefined criteria related to a queue length and/or a time interval; creating a pre-processed index that maps indexed information for a given entity to a portion of the historical database; and, in response to a user query regarding attributes of the given entity: retrieving the data records related to the given entity from the historical database based on the pre-processed index for the given entity; storing the retrieved data records of the given entity into an in-memory database; and processing the retrieved data records of the given entity to answer the one or more user queries.

20 Claims, 7 Drawing Sheets

REAL-TIME AD HOC QUERYING OF DATA RECORDS

FIELD

The invention relates generally to data integration techniques and, more particularly, to techniques for pre-processing and integrating data records, such as call detail records, into an indexed data repository for improved querying of the data records.

BACKGROUND

Telecommunications companies process a variety of data records. One example of such data records are Call Detail Records (CDRs), which consist of data produced by telephone equipment and other communication devices, documenting the details of a call or connection, such as time, duration, completion status, source and destination.

A CDR is a metadata record for a telephone exchange or another communication transaction. A CDR typically indicates a start time, duration, completion status, and a source/destination pair of the corresponding communication, such as a voice call, a short-message services (SMS) message or another data exchange Calls between two cellular telephones, for example, would register the source/destination pair and cell tower in use, but data packets would only record the source and cell tower employed because a destination is not involved. Other relevant attributes of a CDR often include equipment identification, a unique sequence number from the telecommunications provider, a reference to beginning/ending cell towers, routing information, call type (e.g., voice or SMS), mobile telecommunication technology used, and any fault conditions during the call.

CDRs serve several purposes for telecommunications companies and other stakeholders. In law enforcement, for example, CDRs provide information that helps to identify suspects and other persons of interest. In addition, CDRs often reveal details about an individual, such as relationships with associates, communication and behavior patterns, and location information that can identify the whereabouts of an individual during the entirety of a call. CDRs are also used for billing, customer experience management, marketing planning and population movement patterns.

A need exists for a computational system for processing and organizing voluminous data record workloads, such as CDR workloads, that allow for the execution of real-time queries over pre-processed and indexed data records. A further need exists for improved techniques for processing and organizing voluminous data record workloads, allowing for the execution of real-time queries over indexed data records.

SUMMARY

Illustrative embodiments of the present invention provide methods and apparatus for real-time ad hoc querying of data records, such as call detail records. In one exemplary embodiment, a method comprises the steps of obtaining a plurality of data records, wherein each of the data records comprise a plurality of fields and wherein one or more of the fields are used to aggregate a history of at least a portion of the data records; storing each of the plurality of data records in one or more of a plurality of consolidation queues, based on predefined indexing criteria; storing at least a portion of the plurality of data records from one or more of the consolidation queues in a historical database based on one or more predefined criteria related to one or more of a queue length and a time interval; creating a pre-processed index that maps indexed information for a given entity to a portion of the historical database; and in response to one or more user queries regarding one or more attributes of the given entity, performing the following steps: retrieving at least a portion of the data records related to the given entity from the historical database based on the pre-processed index for the given entity; storing the retrieved data records of the given entity into an in-memory database; and processing the retrieved data records of the given entity to answer the one or more user queries.

In one or more embodiments, the plurality of data records comprise call detail records and the consolidation queues comprise a call source queue and a call destination queue for each of a plurality of users of a telecommunication service.

In at least one embodiment, the predefined indexing criteria comprises indexing by one or more fields of the data records that are targets of the one or more user queries. The step of storing in the plurality of consolidation queues optionally further comprises storing the plurality of data records in a waiting queue to accommodate bursts of the data records.

As noted above, illustrative embodiments described herein provide significant improvements relative to conventional data storage systems by pre-processing and indexing CDRs as they are stored. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for real-time ad hoc querying of data records, such as call detail records. While the exemplary embodiments are described in the context of call detail records, the present invention may be employed for processing any data records having multiple fields, where one or more of the fields can be used to aggregate a history of the data records of one or more entities, as would be apparent to a person of ordinary skill in the art. As discussed hereinafter, the history is stored in an in-memory relational database.

In one or more embodiments, historical CDR data is stored by pre-aggregating records indexed by one or more CDR fields that may be the target of end-user queries, thereby allowing fast retrieval of historical data. In at least one embodiment, an exemplary architecture comprises an ingestion system that queues incoming CDR data; a historical system that stores CDR records in a historical database having pre-aggregated data; an index module having a pre-processed index based on end-users target fields; a query system that processes queries on an in-memory integrated indexed history; and an optional janitor module that performs data cleaning activities.

In one or more embodiments, the pre-aggregated CDR records are loaded into in-memory databases for ad hoc queries. For example, when the caller/source and/or caller/destination fields are used as the indexing fields, the data space is partitioned into sets that are compact enough to be quickly transferred from a historical database into an integrated indexed in-memory database where ad hoc queries can be processed.

In the context of law enforcement applications for CDRs, for example, law representatives often request that telecommunication companies, given a list of subjects and a time span, produce reports with their full call history as soon as possible. If those reports take too long to be generated, there can be negative consequences either to the police investigation or to the legal process evolution, resulting in fines applied to the company in some cases.

The challenge is to create a computational system that is able to handle a fast ingestion of event data, while remaining capable of executing real-time or near real-time queries over a vast amount of historical data. Although CDR data is one of the richest data sources in telecommunications, CDR data remains too cumbersome for traditional approaches.

As an example, it has been estimated that one of the largest telecommunications companies in Brazil handles at least three billion calls per day, with peaks of 100,000 calls per second and CDRs holding records that may be, for example, 500 bytes each of data. Brazilian law demands that user call history be preserved for at least five years. Thus, 1.6 petabytes of data is produced per year, which amounts to a database of roughly 7.9 petabytes of data in five years. Thus, when a criminal investigation needs to exemplary answer the question: "Who called subject A, and who was called by subject A, from date X to date Y?," the query must be applied to the large database of CDR data. Meanwhile, the queries should be answered in near real-time by the company in response to a request from law enforcement officials.

In this exemplary context, the following problems arise:
Real-time ingestion of 100,000 events per second (peaks), which overloads traditional client-server approaches. An optimized, scalable and elastic architecture must grow and shrink according to demand.
Near real-time entity identification and retrieval of call detail, when querying for legal purposes. Crunching and analyzing the entire data volume at query time is not efficient, because sources and/or destinations participate in just a small subset of data. A preferred solution would initially prune the search space in order to query only relevant data.
Storage and maintenance of CDR data for predefined timespans (five years, for example, as is the case for law enforcement in Brazil). When working on the scale of petabytes of data, even deleting files or data can be complex. The janitor work of cleaning records older than a specified time span can be tricky for such a big dataset.

In one or more embodiments, an exemplary CDR retrieval architecture provides for the efficient construction and maintenance of historical records according to predefined indexing information. In at least one embodiment, depending on the context of the application, CDR source and destination identifiers are used as the index. However, any other information in a CDR can be indexed as well, or as an alternative to the source and/or destination identifiers, as would be apparent to a person of ordinary skill in the art. For example, geographical information of antennas can be necessary to efficiently answer queries such as "which users passed through this region in the past month?" Examples using CDRs' source and destination as indexes are discussed below.

Figure 1:
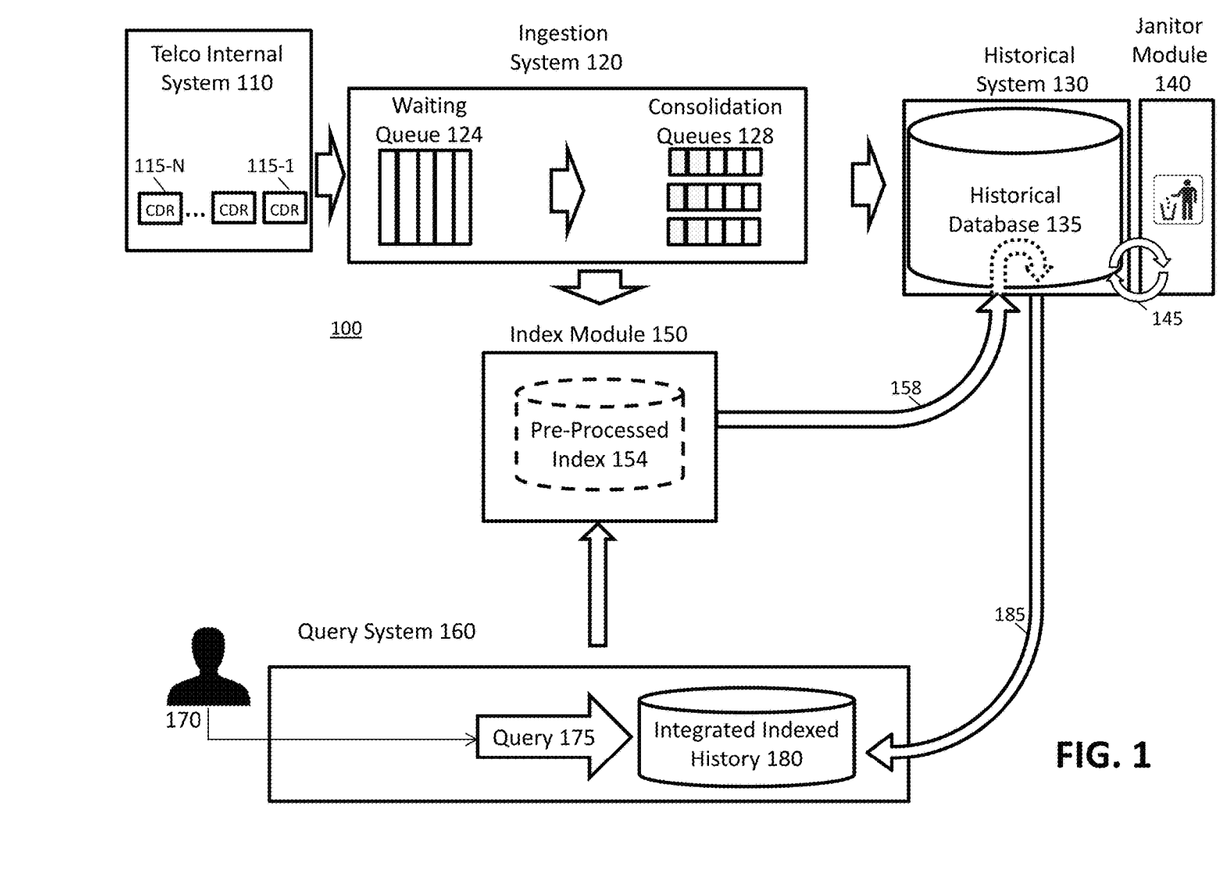
FIG. 1 illustrates an exemplary call detail record retrieval architecture, according to an embodiment of the invention.

FIG. 1 illustrates an exemplary CDR retrieval architecture 100, according to an embodiment of the invention. As shown in FIG. 1, a telecommunication company ("telco") uses one or more internal systems 110 to provide, as input to an ingestion system 120 of the exemplary CDR retrieval architecture 100, a stream of CDRs 115-1 through 115-N. The CDRs come from, e.g., mediation and/or billing systems or raw antenna streams of the telecommunication company, in a known manner. Since the rate of records per second may vary, a waiting queue component 124 optionally serves the purpose of accommodating bursts of CDR records and preventing the saturation of the ingestion system 120. In one or more embodiments, the waiting queue component 124 employs scalable memory pools to support large ingest rates, which can be implemented, for example, through a distributed, elastic infra-structure.

In the embodiment of FIG. 1, every CDR record 115 from the waiting queue 124 is routed to a plurality of consolidation queues 128. If more than one index is required on an index module 150, then the CDRs will be temporarily copied to more consolidation queues (one by index). Generally, the index module 150 explicitly maps each piece of indexed information to its respective historical database 135, as discussed further below.

For example, a pair of consolidation queues 128 can be maintained for each user, with one queue 128 storing CDRs where the user was a source of the communication and another queue 128 storing CDRs where the user was a destination of the communication. In one or more embodiments, the consolidation queue component 128 minimizes the number of write operations to the historical database 135 of a historical system 130, designed, for example, for Online Analytical Processing (OLAP) characterized by a relatively low volume of transactions.

The dataflow inside the ingestion system 120, and how the waiting queue component 124 and the consolidation queue component 128 of FIG. 1 communicate with each other and with other modules in FIG. 1 is discussed further below in conjunction with FIG. 2.

Cleaning routines 145 are optionally scheduled by a janitor module 140, in order to keep only relevant data. The janitor module 140 is discussed further below in conjunction with FIG. 4.

One or more aspects of the invention recognize that a pre-processed index 154 maintained by index module 150 allows historical information about a target entity E (e.g., user, antenna or region) to be quickly retrieved as a single artifact from a distributed/federated database. This artifact, referred to as the integrated history, is comprised of CDRs (or portions thereof) where target entity E was involved and allows data for target entity E to be quickly obtained (158) from the historical database 135. The integrated history can then be loaded (185) into an integrated indexed history 180 of an in-memory database of a query system 160 to satisfy real-time ad hoc queries 175 from a user 170 on any CDR attributes related to the target entity E.

As discussed further below, in response to one or more queries 175 regarding target entity E, the integrated history regarding target entity E is loaded into the integrated indexed history 180, and the ad hoc queries 175 regarding target entity E are processed locally by the query system 160.

The dataflow inside the query system 160, and how the query system 160 interacts with other modules in FIG. 1 is discussed further below in conjunction with FIG. 3.

Figure 2:
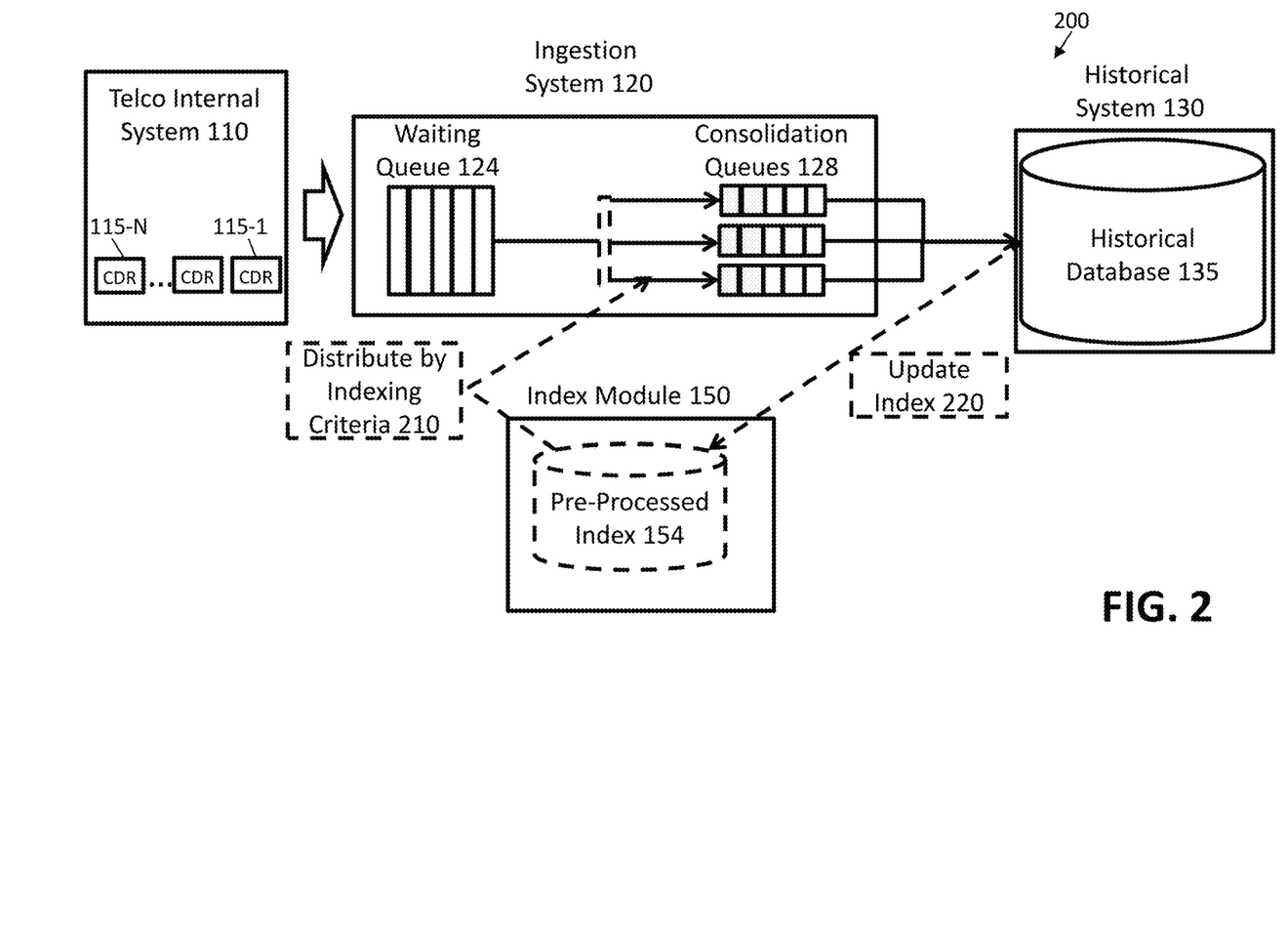
FIG. 2 illustrates an exemplary dataflow inside the ingestion system of FIG. 1, and how components of the ingestion system communicate with other modules of FIG. 1.

FIG. 2 illustrates a dataflow 200 inside the ingestion system 120 of FIG. 1, and how the waiting queue component 124 and the consolidation queue component 128 of FIG. 1 communicate with other modules. As noted above, the waiting queue component 124 accommodates bursts of CDR records and aims to prevent the saturation of the ingestion system 120. In addition, CDR records 115 from the waiting queue 124 are routed to one or more relevant consolidation queues 128. The incoming CDRs 115 are distributed by indexing criteria 210 and applied to the appropriate consolidation queue(s) 128.

While the consolidation queues 128 may increase the amount of ingested CDR data, they are meant to be transient and do not become a bottleneck in terms of memory consumption. In one or more embodiments, this volatility is achieved by monitoring two thresholds: a length threshold and a time threshold. If the length of a given consolidation queue 128 exceeds a predefined length parameter, or the last write occurs after another predefined time threshold, then all of the CDRs in that consolidation queue 128 are flushed to the end of the respective history, being appended to the historical database 135.

The historical system component 130 is a large database 135 capable of persisting, for example, several petabytes of historical data. The historical system component 130 can be implemented, for example, as a Hadoop Distributed File System (HDFS), or another scalable off-the-shelf relational or key-value storage system.

As noted above, the index module 150 serves the purpose of explicitly mapping each piece of indexed information to its respective historical database 135, based on the indexing criteria 210. These indexes 154 are updated 220 at queue consolidation time and, in one or more embodiments, are fast lookup key-value in-memory databases, functionally equivalent to balanced trees such as B-Trees, for example. Given a target entity E, the index 154 responds with the corresponding path (or key) indicating how to retrieve the full indexed history for the target entity E from the historical database 135 to the in-memory database of the query system 160. Generally, the pre-processed index 154 can be implemented using existing implementations of fast and/or balanced tree indexes.

When a given consolidation queue 128 (for example, calls that Alice received) is about to be flushed (i.e., its CDR contents should be moved into the Historical Database), there is a look-up into the pre-processed index 154 to check where to store that information inside the historical database 135. If the look-up fails, that information was not yet present in the historical database 135 either, and that is the appropriate time to allocate a "context" for the "calls that Alice received" in the historical database 135. The address for this particular context is going to be stored in the pre-processed index 154 and flushing the consolidation queue 128 will now succeed.

The components shown in FIG. 2 correspond to the ingestion flow that is permanently working in response to the CDR input stream 115. The components shown of FIG. 2 build the pre-processed indexes 154 and prepare the historical database 135 that will be retrieved by the query system 160, discussed further below.

Figure 3:
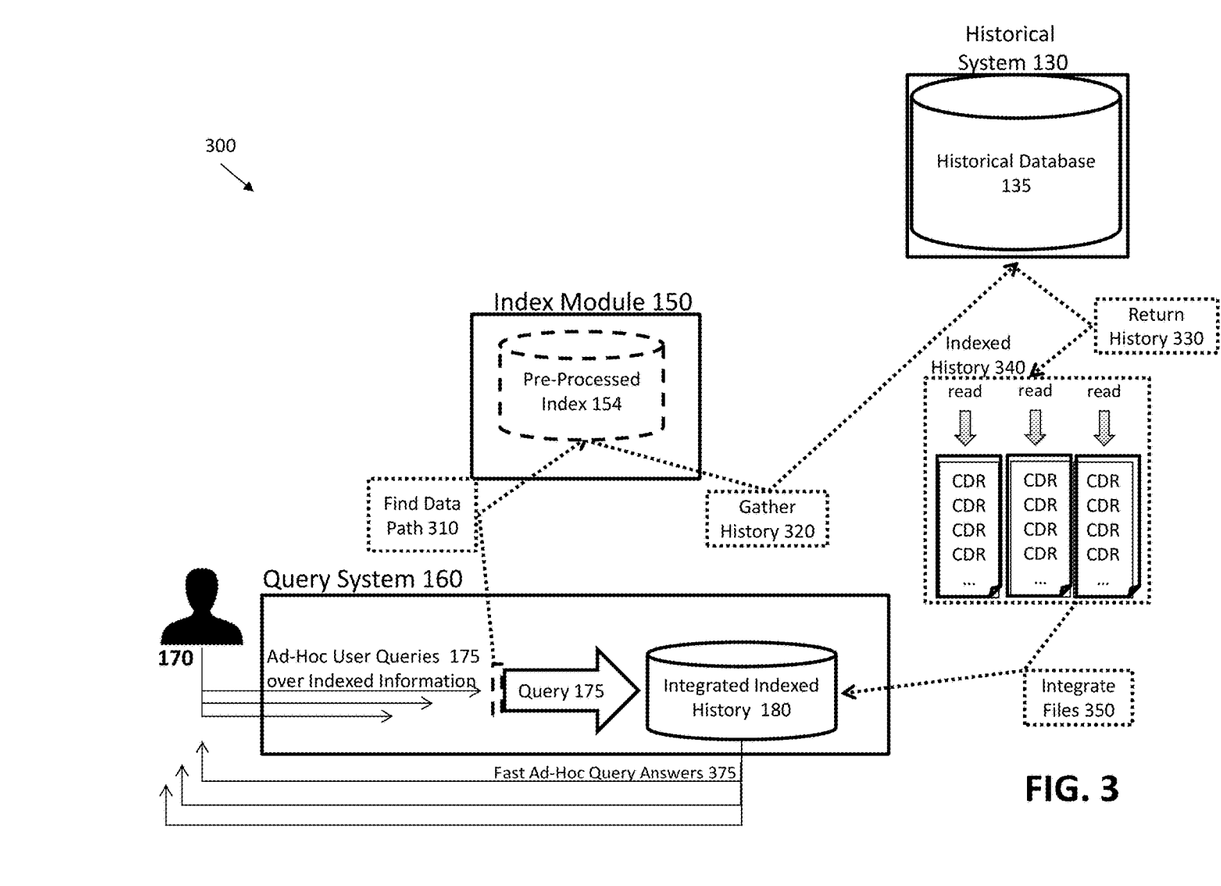
FIG. 3 illustrates an exemplary dataflow inside the query system of FIG. 1, and how the query system interacts with other modules of FIG. 1, according to one embodiment of the invention.

FIG. 3 illustrates the dataflow 300 inside the query system 160, and how the query system 160 interacts with other modules of FIG. 1, according to one embodiment of the invention. In one or more embodiments, the query system 160 is triggered when a user demands information. The exemplary architecture 100 allows for any search involving the available indexes 154. On the given example, the user 170 may submit a query 175 about a given entity E. The system will then use the pre-processed indexes 154 to retrieve the call history of the target entity E. This large object, typically consisting of many CDRs, is integrated in a volatile in-memory database, referred to as the integrated indexed history 180, which is used to process ad hoc user queries 175 over any CDR attribute related to the target E to determine ad hoc query answers 375. The lifespan of the in-memory data in the integrated indexed history 180 is in principle bounded by the user session, but other data reuse mechanisms might be implemented by the in-memory database itself. These ad hoc queries 175 may serve legal purposes, but can also be used in customer profiling, a major interest of modern telecommunication companies.

In response to a user query 175, the pre-processed index 154 is accessed using a find data path operation 310 and then to gather history 320 from the historical database 135. The indexed history 340 is returned using operation 330, which is then integrated into the integrated indexed history 180 using operation 350.

Figure 4:
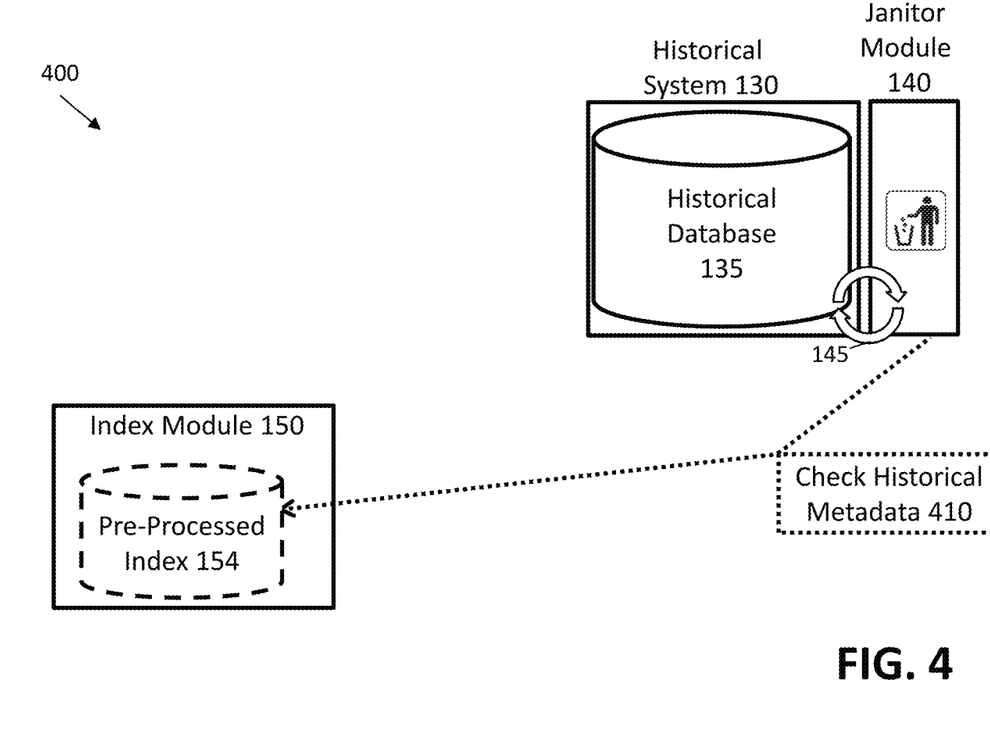
FIG. 4 illustrates exemplary interactions of the janitor module of FIG. 1 with the historical system and the index module of FIG. 1, according to one embodiment of the invention.

FIG. 4 illustrates the interactions 400 of the janitor module 140 with the historical system 130 and the index module 150, according to one embodiment of the invention. As noted above, cleaning routines 145 are optionally scheduled by the janitor module 140, in order to keep only relevant data.

In one or more embodiments, the janitor module 140 is responsible for deleting call detail outside of a specified time span (e.g., the legal constraint of 5 years from Brazilian law). With the disclosed architecture, only the historical database 135 needs to be monitored. In addition, metadata 410 added to the indexing components in the pre-processed index 154 (e.g., earliest and latest CDR date and time) can further aid the janitor module 140 in only processing the CDR records that need to be cleaned, making the cleaning operation 145 in large CDR datasets more efficient.

Client Information Examples

Figure 5:
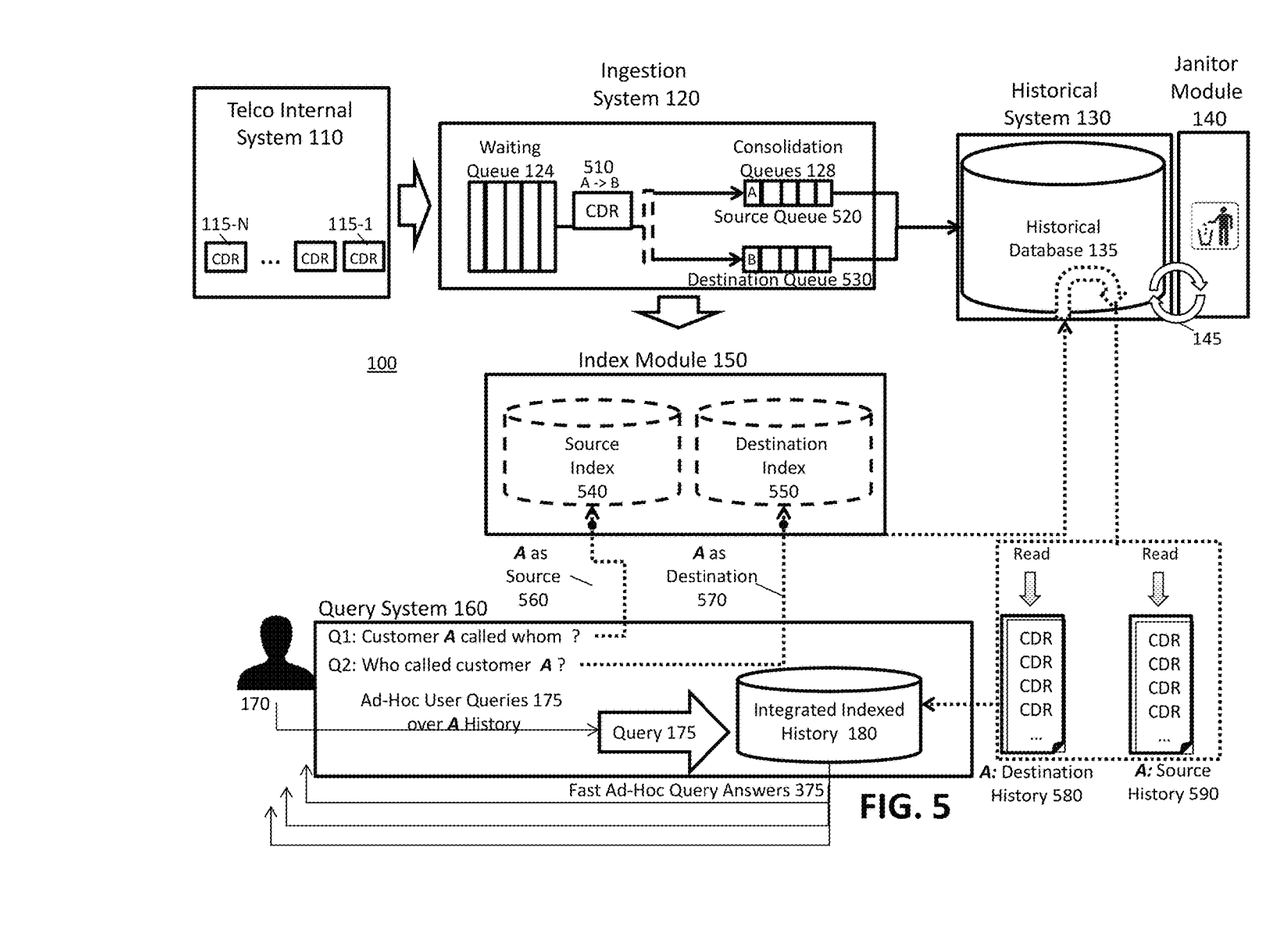
FIG. 5 illustrates an exemplary use of the retrieval architecture of FIG. 1 using source and destination as indexes.

FIG. 5 illustrates an exemplary use of the CDR retrieval architecture 100 of FIG. 1 using source and destination as indexes. For example, in order to answer questions, such as: "Who called customer A, and/or who did customer A call?" The architecture 100 of FIG. 1 may be instantiated as shown in FIG. 5 using the source and destination fields of the CDRs as a source index 540 and a destination index 550, respectively, in the index module 150, respectively based on a related source consolidation queue 520 and a destination consolidation queue 530. FIG. 5 shows an exemplary CDR 510 from caller A to called party B.

An important aspect of the use case of FIG. 5 is the construction and maintenance of one source call history and one destination call history per customer. This information can be gathered as the integrated history for the given (target) user A, which will be loaded into the in-memory database on the query system 160 to satisfy ad-hoc user queries 175 on any CDR attributes related to the target customer A.

In FIG. 5, a CDR 510 is processed from the waiting queue 124, where customer A called customer B. In one or more embodiments, every record from the waiting queue 124 will be copied to two consolidation queues 520, 530. One of the queues 520 contains all recent records where A was the source of some call. The second queue 530 contains all recent records where B was the destination of some call.

After some elapsed time or queue length threshold, as described above, the consolidation queue component 128 will flush its contents into the related historical database 135 (source history 590 for A and destination history 580 for A) and then update the index 180 with the "source A called destination B" file path information.

When a user asks in a query 175 for the available information about client A for any reason (e.g., law enforcement, client profiling, user experience management or other purpose), the user will receive a consolidated dataset containing information about the calls originated by A and received by A. With this data set being a smaller dataset than the petabyte-scale CDR database 135, the user can then submit ad hoc queries 175 to the in-memory database 180 and receive the answers 375 almost instantly.

For example, in response to a query "customer A called whom?," the source index 540 is accessed with A as the source 560. Likewise, in response to a query "Who called customer A?," the destination index 550 is accessed with A as the destination 570.

The integrated indexed history 180 is the name of the in-memory database. Consider an investigator that issues the following query 175: "Did Alice call someone who, within minutes (less than an hour), called Bob on a given date?" The integrated index history 180 is a database that is initially empty. The call history of Alice 580, 590 is retrieved from the historical database 135, and used to populate the integrated indexed history 180.

In one or more embodiments, while stored in historical database 135, that data is organized as two independent sequential lists 580, 590 of call records (CDRs), that is, with Alice as call destination and as call source, respectively. When those pieces of data are stored in the integrated indexed history 180, they are organized differently, because it is a relational database. The relational database will create internal indexes on its own to allow fast queries over the other attributes of the CDRs (which is why the integrated indexed history 180 is referred to as Indexed). Later, the same thing will happen with Bob's source and destination CDRs.

In the end, the integrated indexed history 180 will hold information from both Alice and Bob (which is why the integrated indexed history 180 is referred to as Integrated).

CONCLUSION

One or more embodiments of the invention provide methods and apparatus for real-time ad hoc querying of data records, such as call detail records.

The foregoing applications and associated embodiments should be considered as illustrative only, and numerous other embodiments can be configured using the techniques disclosed herein, in a wide variety of different applications.

It should also be understood that the techniques for real-time ad hoc querying of data records, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed real-time ad hoc querying techniques may be implemented using one or more processing platforms. One or more of the processing modules or other components may therefore each run on a computer, storage device or other processing platform element. A given such element may be viewed as an example of what is more generally referred to herein as a "processing device."

Figure 6:
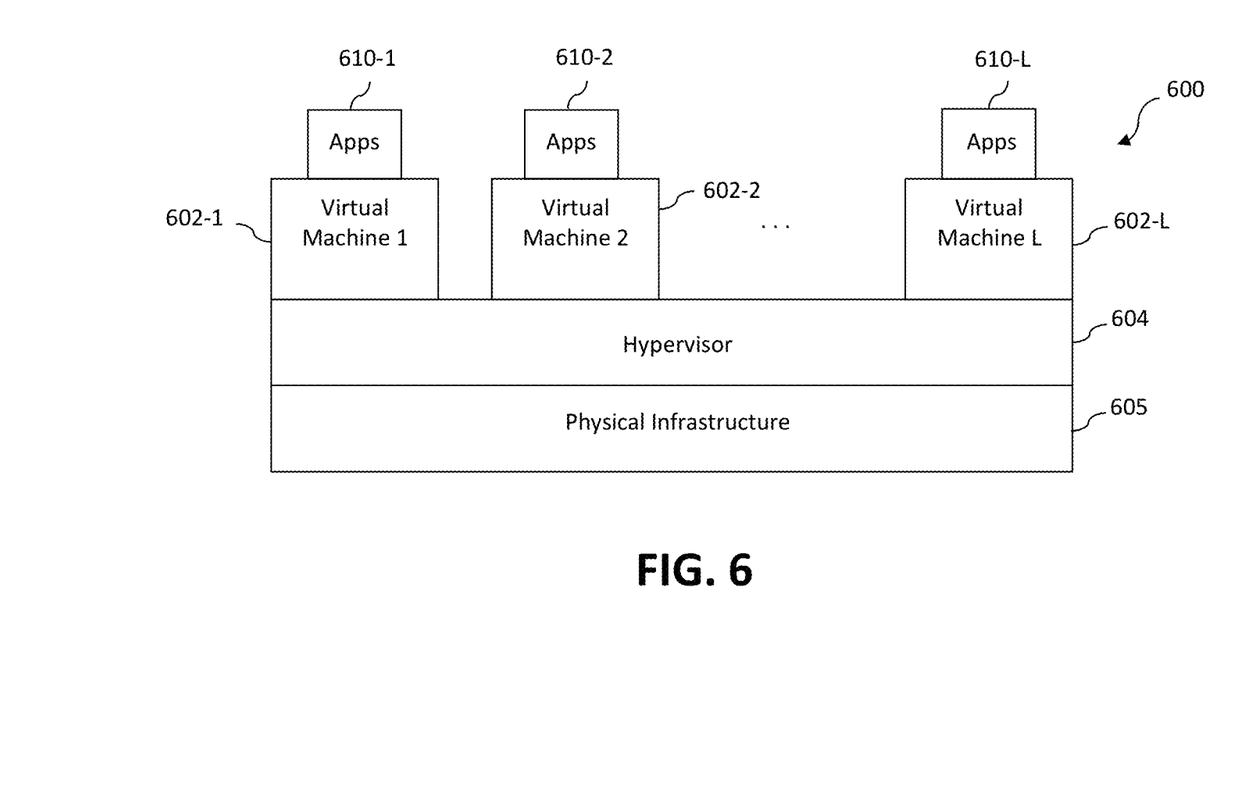
FIG. 6 illustrates an exemplary processing platform that may be used to implement at least a portion of one or more embodiments of the invention comprising a cloud infrastructure.

Referring now to FIG. 6, one possible processing platform that may be used to implement at least a portion of one or more embodiments of the invention comprises cloud infrastructure 600. The cloud infrastructure 600 in this exemplary processing platform comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

The cloud infrastructure 600 may encompass the entire given system or only portions of that given system, such as one or more of client, servers, controllers, or computing devices in the system.

Although only a single hypervisor 604 is shown in the embodiment of FIG. 6, the system may of course include multiple hypervisors each providing a set of virtual machines using at least one underlying physical machine.

An example of a commercially available hypervisor platform that may be used to implement hypervisor 604 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 7:
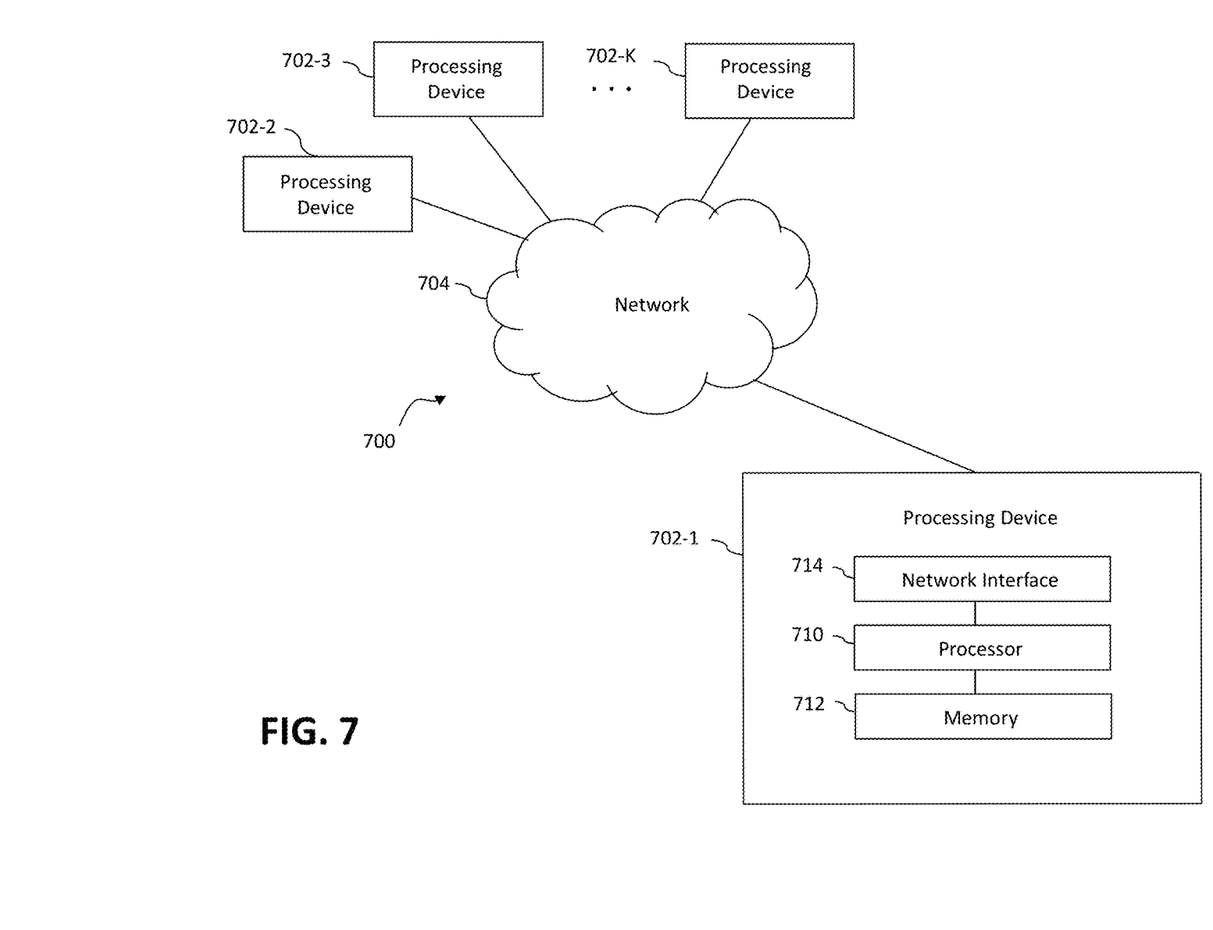
FIG. 7 illustrates another exemplary processing platform that may be used to implement at least a portion of one or more embodiments of the invention.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
obtaining a plurality of data records, wherein each of said data records comprise a plurality of fields and wherein one or more of said fields are used to aggregate a history of at least a portion of said data records;
storing each of said plurality of data records in one or more of a plurality of consolidation queues, based on predefined indexing criteria;
storing at least a portion of said plurality of data records from one or more of said consolidation queues in a historical database based on one or more predefined criteria related to one or more of a queue length and a time interval;
creating a pre-processed index that maps indexed information for a given entity to a portion of said historical database; and
in response to one or more user queries regarding one or more attributes of said given entity, performing the following steps:
retrieving at least a portion of the data records related to the given entity from the historical database based on the pre-processed index for the given entity;
storing the retrieved data records of the given entity into an in-memory database; and
processing said retrieved data records of the given entity to answer said one or more user queries.

2. The method of claim 1, wherein said plurality of data records comprise call detail records and wherein said consolidation queues comprise a call source queue and a call destination queue for each of a plurality of users of a telecommunication service.

3. The method of claim 2, wherein said one or more user queries comprise one or more of a query from a law enforcement agency and a customer profiling query.

4. The method of claim 1, wherein said given entity comprises one or more of a user of a telecommunication service, an item of telecommunication equipment and a geographic area.

5. The method of claim 1, wherein said storing in said plurality of consolidation queues further comprises storing said plurality of data records in a waiting queue to accommodate bursts of said data records.

6. The method of claim 1, further comprising the step of updating said pre-processed index performed substantially simultaneously with a consolidation of one or more of said consolidation queues.

7. The method of claim 1, further comprising the step of deleting data from said historical database based on predefined maintenance criteria.

8. The method of claim 1, wherein said historical database comprises pre-aggregated data, aggregated for each of a plurality of entities based on said one or more of said fields.

9. The method of claim 1, wherein said predefined indexing criteria comprises indexing by one or more fields of said data records that are targets of said one or more user queries.

10. A computer program product, comprising a tangible machine-readable storage medium having encoded therein executable code of one or more software programs, wherein the one or more software programs when executed by at least one processing device perform the following steps:

obtaining a plurality of data records, wherein each of said data records comprise a plurality of fields and wherein one or more of said fields are used to aggregate a history of at least a portion of said data records;

storing each of said plurality of data records in one or more of a plurality of consolidation queues, based on predefined indexing criteria;

storing at least a portion of said plurality of data records from one or more of said consolidation queues in a historical database based on one or more predefined criteria related to one or more of a queue length and a time interval;

creating a pre-processed index that maps indexed information for a given entity to a portion of said historical database; and     in response to one or more user queries regarding one or more attributes of said given entity, performing the following steps:

retrieving at least a portion of the data records related to the given entity from the historical database based on the pre-processed index for the given entity;

storing the retrieved data records of the given entity into an in-memory database; and     processing said retrieved data records of the given entity to answer said one or more user queries.

11. The computer program product of claim 10, wherein said plurality of data records comprise call detail records and wherein said consolidation queues comprise a call source queue and a call destination queue for each of a plurality of users of a telecommunication service.

12. The computer program product of claim 10, wherein said storing in said plurality of consolidation queues further comprises storing said plurality of data records in a waiting queue to accommodate bursts of said data records.

13. The computer program product of claim 10, wherein said historical database comprises pre-aggregated data, aggregated for each of a plurality of entities based on said one or more of said fields.

14. The computer program product of claim 10, wherein said predefined indexing criteria comprises indexing by one or more fields of said data records that are targets of said one or more user queries.

15. A system, comprising:
a memory; and
at least one processing device, coupled to the memory, operative to implement the following steps:

obtaining a plurality of data records, wherein each of said data records comprise a plurality of fields and wherein one or more of said fields are used to aggregate a history of at least a portion of said data records;

storing each of said plurality of data records in one or more of a plurality of consolidation queues, based on predefined indexing criteria;

storing at least a portion of said plurality of data records from one or more of said consolidation queues in a historical database based on one or more predefined criteria related to one or more of a queue length and a time interval;

creating a pre-processed index that maps indexed information for a given entity to a portion of said historical database; and     in response to one or more user queries regarding one or more attributes of said given entity, performing the following steps:

retrieving at least a portion of the data records related to the given entity from the historical database based on the pre-processed index for the given entity;

storing the retrieved data records of the given entity into an in-memory database; and     processing said retrieved data records of the given entity to answer said one or more user queries.

16. The system of claim 15, wherein said plurality of data records comprise call detail records and wherein said consolidation queues comprise a call source queue and a call destination queue for each of a plurality of users of a telecommunication service.

17. The system of claim 15, wherein said storing in said plurality of consolidation queues further comprises storing said plurality of data records in a waiting queue to accommodate bursts of said data records.

18. The system of claim 15, further comprising the step of deleting data from said historical database based on predefined maintenance criteria.

19. The system of claim 15, wherein said historical database comprises pre-aggregated data, aggregated for each of a plurality of entities based on said one or more of said fields.

20. The system of claim 15, wherein said predefined indexing criteria comprises indexing by one or more fields of said data records that are targets of said one or more user queries.

* * * * *